(12) United States Patent
Lim

(10) Patent No.: US 11,067,119 B2
(45) Date of Patent: Jul. 20, 2021

(54) WHEEL HUB AND SLINGER ASSEMBLY, WHEEL BEARING ASSEMBLY, AND METHOD OF PRODUCING WHEEL HUB AND SLINGER ASSEMBLY

(71) Applicant: ILJIN GLOBAL CO., LTD, Seoul (KR)

(72) Inventor: Jong Keun Lim, Seoul (KR)

(73) Assignee: ILJIN GLOBAL CO., LTD, Seoul (KR)

( * ) Notice: Subject to any disclaimer, the term of this patent is extended or adjusted under 35 U.S.C. 154(b) by 0 days.

(21) Appl. No.: 16/890,442

(22) Filed: Jun. 2, 2020

(65) Prior Publication Data
US 2020/0291990 A1 Sep. 17, 2020

Related U.S. Application Data

(63) Continuation of application No. PCT/KR2019/004309, filed on Apr. 10, 2019.

(30) Foreign Application Priority Data

Apr. 17, 2018 (KR) .................. 10-2018-0044360

(51) Int. Cl.
*F16C 19/18* (2006.01)
*F16C 33/76* (2006.01)
(Continued)

(52) U.S. Cl.
CPC .......... *F16C 19/183* (2013.01); *F16C 33/762* (2013.01); *F16C 33/7863* (2013.01);
(Continued)

(58) Field of Classification Search
CPC .......... F16C 19/183; F16C 33/782–784; F16C 33/786; F16C 33/7863; F16C 33/7869;
(Continued)

(56) References Cited

U.S. PATENT DOCUMENTS 8,246,253 B2 * 8/2012 Masui .................. F16C 33/783
  384/484
9,546,687 B2 * 1/2017 Kaiser .................. F16C 33/805
(Continued)

FOREIGN PATENT DOCUMENTS

DE 102017110414 A1 * 11/2017 .......... F16C 33/7866
JP 2011117475 A * 6/2011 .......... F16C 33/7879
(Continued)

OTHER PUBLICATIONS

International Search Report of PCT/KR2019/004309 dated Jul. 11, 2019.

*Primary Examiner* — Marcus Charles
(74) *Attorney, Agent, or Firm* — Dinsmore & Shohl LLP; Yongsok Choi, Esq.

(57) ABSTRACT

A wheel hub and slinger assembly includes a wheel hub including a base surface, a tolerance compensation portion extending from the base surface and formed to be concave in an axially outward direction, and a flange surface extending from the tolerance compensation portion in a radially outward direction, and a slinger including a mounting portion having an axially inward end portion and a first inner peripheral surface and configured to be press-fitted to the base surface, a bent portion having a second inner peripheral surface spaced apart from the tolerance compensation portion and extending from the mounting portion in a curved surface shape, and an extending portion extending from the bend portion and having a contact surface in contact with the flange surface in the radially outward direction. A stopper having an axially outward end portion surface and a radially outward end portion surface is formed on the wheel hub.

6 Claims, 7 Drawing Sheets

(51) Int. Cl.
*F16C 33/78* (2006.01)
*F16C 33/64* (2006.01)
*F16J 15/34* (2006.01)

(52) U.S. Cl.
CPC ....... *F16C 33/7869* (2013.01); *F16J 15/3464* (2013.01); *F16C 2326/02* (2013.01)

(58) Field of Classification Search
CPC .............. F16C 33/7886; F16C 32/3464; F16C 2326/02; F16C 2326/06; F16C 33/762; F16J 15/34; F16J 34/3436; F16J 15/3268; F16J 15/3464
USPC ............... 384/477, 484, 488, 490, 510, 544; 277/351, 562, 572, 577, 593, 598, 644
See application file for complete search history.

(56) References Cited

U.S. PATENT DOCUMENTS

| | | | | |
|---|---|---|---|---|
| 9,982,719 B2 * | 5/2018 | Harada | ................. | F16C 33/805 |
| 10,253,814 B2 * | 4/2019 | Shaikh | ................. | F16C 33/7889 |
| 10,723,173 B2 * | 7/2020 | Morello | ................. | F16J 15/3256 |
| 10,746,229 B2 * | 8/2020 | Lim | ................. | F16C 33/7833 |
| 2010/0129018 A1 * | 5/2010 | Shigeoka | ................. | B60B 27/0084 384/544 |
| 2015/0003766 A1 * | 1/2015 | Duch | ................. | F16C 33/7879 384/480 |
| 2015/0151574 A1 * | 6/2015 | Barberis | ................. | B60B 27/0005 384/486 |
| 2016/0003302 A1 * | 1/2016 | Seno | ................. | F16C 33/7886 277/351 |
| 2016/0178010 A1 * | 6/2016 | Kaiser | ................. | F16C 33/7886 277/351 |
| 2017/0335890 A1 * | 11/2017 | Harada | ................. | F16C 33/7826 |

FOREIGN PATENT DOCUMENTS

| | | | | |
|---|---|---|---|---|
| JP | 2014240679 A | 12/2014 | | |
| JP | 2017133532 A | 8/2017 | | |
| JP | 6466082 B2 * | 2/2019 | ............ | F16C 33/805 |
| KR | 1020170065998 A | 6/2017 | | |
| KR | 1020170103571 A | 9/2017 | | |
| KR | 1020180011683 A | 2/2018 | | |
| WO | WO-2018021655 A1 * | 2/2018 | ............ | B60B 27/00 |

* cited by examiner

WHEEL HUB AND SLINGER ASSEMBLY, WHEEL BEARING ASSEMBLY, AND METHOD OF PRODUCING WHEEL HUB AND SLINGER ASSEMBLY

CROSS-REFERENCE TO RELATED APPLICATIONS

This application is a continuation of International Application No. PCT/KR2019/004309 filed on Apr. 10, 2019, which claims priority to Korean Patent Application No. 10-2018-0044360 filed on Apr. 17, 2018, the entire contents of which are herein incorporated by reference.

FIELD

The present disclosure relates to a wheel hub and slinger assembly, a wheel bearing assembly, and a method of producing the wheel hub and slinger assembly.

BACKGROUND

A chassis of a vehicle comprises a wheel, a wheel hub and a wheel bearing. The wheel is installed on the wheel hub and rotates with the wheel hub. The wheel bearing comprises an outer ring coupled to the chassis, an inner ring coupled to the wheel hub, and a plurality of rolling elements arranged between the outer ring and the inner ring. The wheel hub is installed on the wheel bearing (e.g., the inner ring) and rotates relative to the chassis. In order to prevent the inflow of foreign substance such as dust or water, a seal member is disposed between the wheel hub and the wheel bearing. The seal member is mounted to the wheel hub such that a seal lip (or seal lips) is in direct contact with a flange surface of the wheel hub.

SUMMARY

Technical Problem

In the case in which the seal lip of the seal member is in direct contact with the flange surface of the wheel hub as a conventional wheel bearing, foreign substance such as dust or water may be flown onto the flange surface, which may cause corrosion of the flange surface of the wheel hub. As a result, the seal lip may be worn due to the corrosion of the flange surface.

In order to alleviate the wear of the seal lip, a technique of mounting a slinger to the flange surface of the wheel hub has been developed. However, when external impact is applied to the wheel bearing, the slinger may be axially moved with respect to the wheel hub, so that the interference between the slinger and the seal lip may be increased. Accordingly, the drag torque of the wheel bearing may be raised due to the interference between the slinger and the seal lip.

In order to prevent the slinger from moving axially with respect to the wheel hub, a technique of forming a stopper on the wheel hub has been developed. However, in consideration of manufacturing tolerances of the slinger and the wheel hub, a length from the flange of the wheel hub to the stopper needs to be set to be longer than that of the slinger such that the slinger can be mounted on the wheel hub.

The present disclosure is provided to solve the aforementioned problems in the related art, and provides a wheel hub and slinger assembly, a wheel bearing assembly, and a method of producing the wheel hub and slinger assembly, which are configured to reduce or suppress the axial movement of the slinger with respect to the wheel hub.

Technical Solution

Embodiments according to an aspect of the present disclosure relate to a wheel hub and slinger assembly installed on a wheel bearing and configured to rotate relative to a chassis. The wheel hub and slinger assembly according to an exemplary embodiment may comprise: a wheel hub comprising a base surface, a tolerance compensation portion extending from the base surface and formed to be concave in an axially outward direction, and a flange surface extending from the tolerance compensation portion in a radially outward direction; and a slinger comprising a mounting portion having an axially inward end portion and a first inner peripheral surface and configured to be press-fitted to the base surface, a bent portion having a second inner peripheral surface spaced apart from the tolerance compensation portion and extending from the mounting portion in a curved surface shape, and an extending portion extending from the bent portion in the radially outward direction and having a contact surface in contact with the flange surface. A stopper may be formed on the wheel hub so as to protrude in the radially outward direction from an axially inward end portion of the base surface. The stopper may have an axially outward end portion surface and a radially outward end portion surface. The slinger may be mounted to the wheel hub such that the mounting portion is positioned between the flange surface and the stopper.

In one embodiment, the slinger may be mounted to the wheel hub such that the axially inward end portion of the mounting portion is brought into contact with the axially outward end portion surface of the stopper.

In one embodiment, the slinger may be mounted to the wheel hub such that the mounting portion passes through the radially outward end portion surface of the stopper in the axially outward direction from the stopper, and then the axially inward end portion of the mounting portion is caught to the stopper.

In one embodiment, when the mounting portion passes through the radially outward end portion surface of the stopper, a portion of the bent portion may be elastically deformed inward of the tolerance compensation portion.

In one embodiment, after a portion of the bent portion is elastically deformed inward of the tolerance compensation portion, the axially inward end portion of the mounting portion may push the stopper by virtue of an elastic restoration force of the bent portion.

In one embodiment, the slinger may be mounted to the wheel hub such that the axially inward end portion of the mounting portion is spaced apart from the axially outward end portion surface of the stopper.

In one embodiment, the flange surface may comprise a second flange surface which is spaced apart from the contact surface of the extending portion.

In one embodiment, the tolerance compensation portion may be formed to be positioned in the radially outward direction of the base surface, and the tolerance compensation portion may be formed to be positioned in the axially outward direction of the flange surface.

Embodiments according to another aspect of the present disclosure relate to a wheel bearing assembly. The wheel bearing assembly according to an exemplary embodiment may comprise: a wheel hub comprising a base surface and a tolerance compensation portion extending from the base surface and formed to be concave in an axially outward direction; at least one inner ring mounted to the wheel hub; an outer ring disposed to be spaced apart from an outer peripheral surface of the wheel hub in a radially outward direction; a plurality of rolling elements interposed between the inner ring and the outer ring and between the wheel hub and the outer ring; and a slinger comprising a mounting portion having an axially inward end portion and a first inner peripheral surface and configured to be press-fitted to the base surface, and a bent portion having a second inner peripheral surface spaced apart from the tolerance compensation portion and extending from the mounting portion in a curved surface shape. A stopper may be formed on the wheel hub so as to protrude in the radially outward direction from an axially inward end portion of the base surface. The stopper may have an axially outward end portion surface and a radially outward end portion surface. The slinger may be mounted to the wheel hub such that the mounting portion is positioned on the base surface.

In one embodiment, the slinger may be mounted to the wheel hub such that the axially inward end portion of the mounting portion is brought into contact with the axially outward end portion surface of the stopper.

In one embodiment, the slinger may be mounted to the wheel hub such that the mounting portion passes through the radially outward end portion surface of the stopper in the axially outward direction from the stopper, and then the axially inward end portion of the mounting portion is caught to the stopper.

In one embodiment, when the mounting portion passes through the radially outward end portion surface of the stopper, a portion of the bent portion may be elastically deformed inward of the tolerance compensation portion.

In one embodiment, after a portion of the bent portion is elastically deformed inward of the tolerance compensation portion, the axially inward end portion of the mounting portion may push the stopper by virtue of an elastic restoration force of the bent portion.

In one embodiment, the slinger may be mounted to the wheel hub such that the axially inward end portion of the mounting portion is spaced apart from the axially outward end portion surface of the stopper.

In one embodiment, the wheel hub may further comprise a flange surface extending from the tolerance compensation portion in the radially outward direction, and the slinger may further comprise an extending portion extending from the bent portion in the radially outward direction and having a contact surface in contact with the flange surface.

In one embodiment, the tolerance compensation portion may be formed to be positioned in the radially outward direction of the base surface, and the tolerance compensation portion may be formed to be positioned in the axially outward direction of the flange surface.

In one embodiment, the flange surface may further comprise a second flange surface which is spaced apart from the contact surface of the extending portion.

Embodiments according to another aspect of the present disclosure relate to a method of producing a wheel hub and slinger assembly, which is installed on a wheel bearing and configured to rotate relative to a chassis. The method according to an exemplary embodiment may comprise: fabricating a wheel hub comprising a base surface, a tolerance compensation portion extending from the base surface and formed to be concave in an axially outward direction, and a flange surface extending from the tolerance compensation portion in a radially outward direction, wherein a stopper may be formed on the wheel hub so as to protrude from an axially inward end portion of the base surface in the radially outward direction, the stopper having an axially outward end portion surface and a radially outward end portion surface, and the wheel hub may be fabricated within a predetermined tolerance range; fabricating a slinger comprising a mounting portion having an axially inward end portion and configured to be press-fitted to the base surface, a bent portion spaced apart from the tolerance compensation portion and extending from the mounting portion in a curved surface shape, and an extending portion extending from the bent portion in the radially outward direction and configured to be brought into contact with the flange surface, wherein the slinger may be fabricated within a predetermined tolerance range; arranging the wheel hub and the slinger such that central axes of the wheel hub and the slinger are in a coaxial relationship with each other; and mounting the slinger to the wheel hub using a jig such that the mounting portion is positioned between the flange surface and the stopper.

In one embodiment, in the mounting of the slinger to the wheel hub, the mounting portion passes through the radially outward end portion surface of the stopper in the axially outward direction from the stopper, and then the axially inward end portion of the mounting portion may be caught to the stopper.

In one embodiment, the mounting of the slinger to the wheel hub may comprise: allowing a portion of the bent portion to be elastically deformed inward of the tolerance compensation portion; and allowing the axially inward end portion of the mounting portion to push the stopper by virtue of an elastic restoration force of the bent portion.

In one embodiment, in the mounting of the slinger to the wheel hub, the jig may push the axially inward end portion of the mounting portion.

In one embodiment, in the mounting of the slinger to the wheel hub, the jig may push a portion adjacent to the bent portion in the extending portion.

In one embodiment, in the mounting of the slinger to the wheel hub, the jig may push a portion adjacent the bent portion in the extending portion and a portion adjacent to a radially outward end portion of the extending portion.

In one embodiment, in the mounting of the slinger to the wheel hub, the jig may push the bent portion.

Advantageous Effects

In a wheel hub and slinger assembly, a wheel bearing assembly, and a method of producing the wheel hub and slinger assembly according to one embodiment, a stopper is formed on the wheel hub so as to protrude in a radially outward direction, and a mounting portion of the slinger, which is press-fitted to a base surface of the wheel hub, has a radially inward end portion. Further, the slinger is mounted to the wheel hub such that the axially inward end portion of the mounting portion is caught to the stopper. When the slinger is mounted to the wheel hub, the slinger is positioned between a flange surface of the wheel hub and the stopper. With such a structure of the slinger and the stopper, it is possible to reduce or suppress an axial movement of the slinger with respect to the wheel hub.

Figure 1:
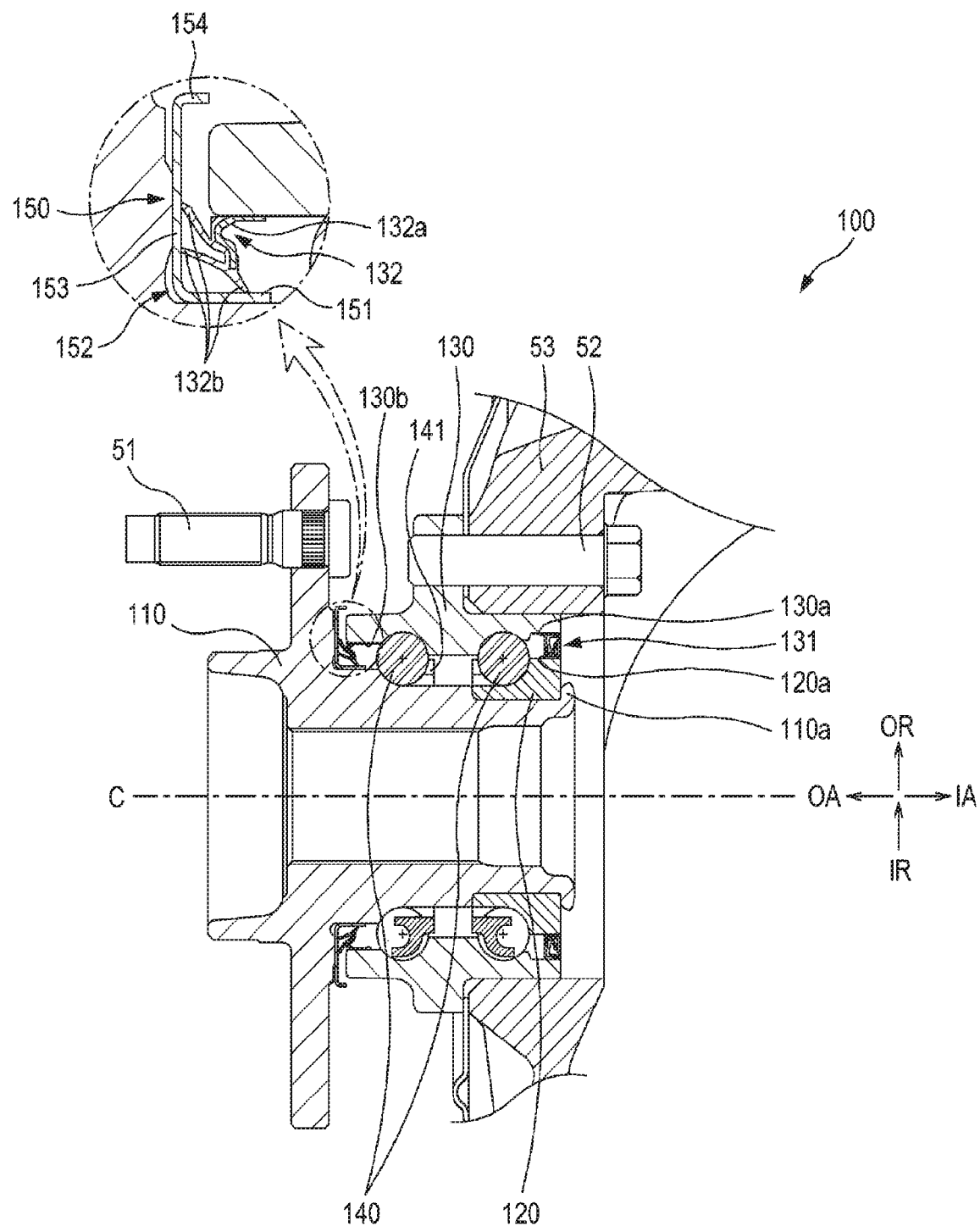
FIG. 1 is a cross-sectional view showing a wheel bearing assembly according to one embodiment of the present disclosure.

EXPLANATION OF REFERENCE NUMERALS 10, 20, 30, 40: jig, 11, 21, 31, 41: pushing portion, 50: wheel hub and slinger assembly, 51: wheel bolt, 52: knuckle bolt, 53: knuckle, 100: wheel bearing assembly, 110: wheel hub, 111: base surface, 111a: axially inward end portion, 111b: hub groove, 112: tolerance compensation portion, 113: flange surface, 114: stopper, 114a: axially outward end portion surface, 114b: radially outward end portion surface, 120: inner ring, 120a: outer peripheral surface, 130: outer ring, 130a: axially inward inner peripheral surface, 130b: axially outward inner peripheral surface, 131: inner seal member, 132: outer seal member, 132a: seal frame, 132b: seal lip, 140: rolling element, 141: retainer, 150: slinger, 151: mounting portion, 151a: axially inward end portion, 151b: first inner peripheral surface, 152: bent portion, 152a: second inner peripheral surface, 153: extending portion, 153a: contact surface, 154: seal portion

DETAILED DESCRIPTION

Embodiments of the present disclosure are exemplified for the purpose of describing the technical spirit of the present disclosure. The scope of the claims according to the present disclosure is not limited to the embodiments described below or to the detailed descriptions of these embodiments.

Unless otherwise defined, all technical and scientific terms used herein have the same meaning commonly understood by those skilled in the art to which the present disclosure pertains. All terms used herein are selected for the purpose of more clearly describing the present disclosure and not limiting the scope of the present disclosure defined by appended claims.

Unless the phrase or sentence clearly indicates otherwise, terms "comprising", "including", "having" and the like used herein should be construed as open-ended terms encompassing the possibility of including other embodiments.

The singular form described herein may include the plural form unless the context clearly dictates otherwise, and this is equally applied to the singular form set forth in the claims.

Terms a "first," a "second," and the like are used to distinguish a plurality of components, and the order or importance of corresponding components is not limited by these terms.

A directional directive of a "radially outward direction" used herein means a direction away from a rotational axis in a radial direction with respect to the rotational axis of a rotating body, and a directional directive of a "radially inward direction" means a direction opposite to the radially outward direction. Further, a directional directive of an "axially outward direction", "outward" or the like used herein means a direction oriented outward of a vehicle body along the rotational axis of the rotating body, and a directional directive of an "axially inward direction", "inward" or the like means a direction oriented inward of the vehicle body along the rotational axis of the rotating body.

Hereinafter, embodiments of the present disclosure will be described with reference to the accompanying drawings. In the accompanying drawings, same reference numerals will be assigned to same or corresponding components. Further, in the following descriptions of the embodiments, duplicate descriptions of same or corresponding components may be omitted. However, even though the description of any component is omitted, such a component is not intended to be excluded in any embodiment.

Figure 2:
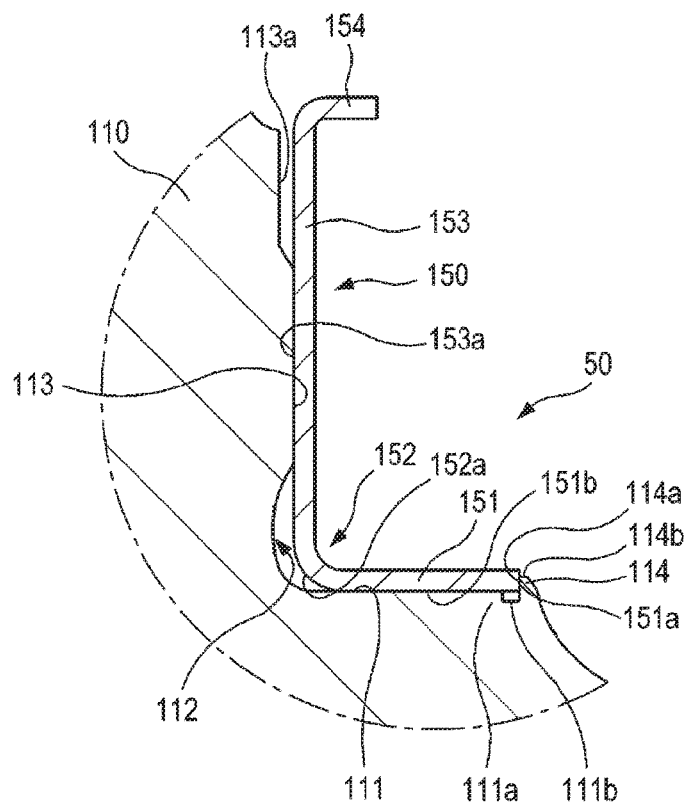
FIG. 2 is a partially exploded view of a wheel hub and a slinger shown in FIG. 1.
Figure 3:
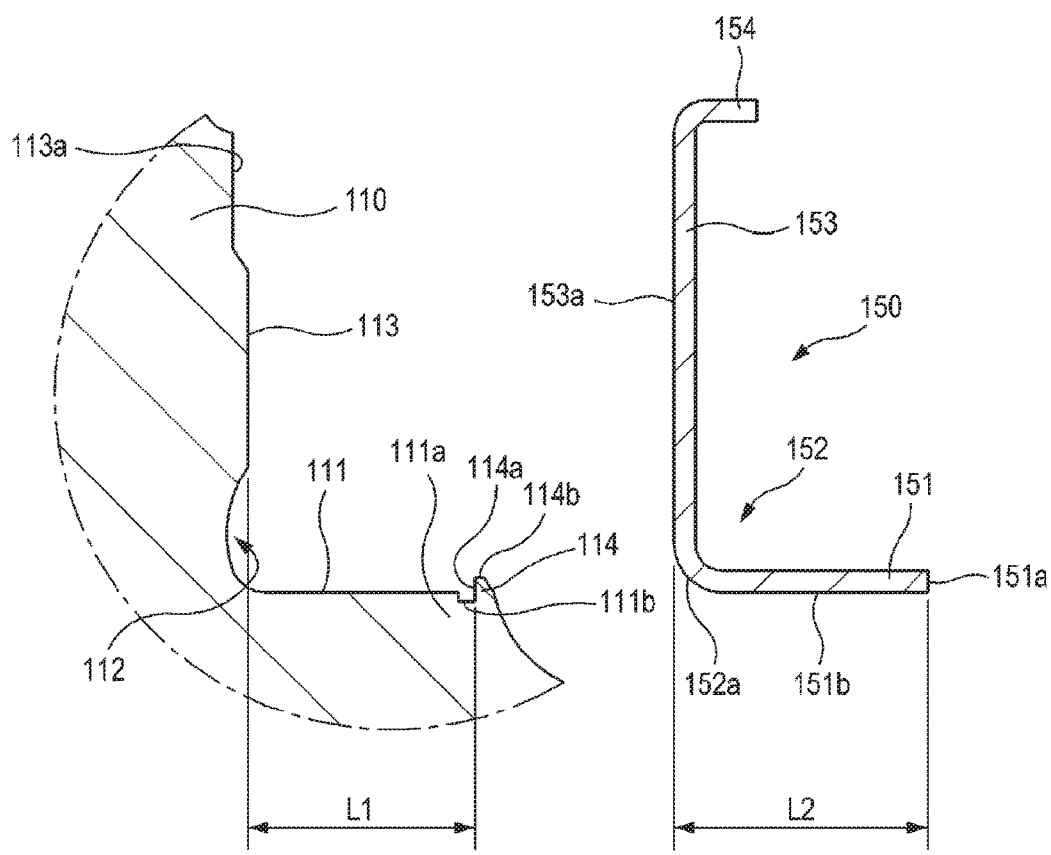
FIG. 3 is a cross-sectional view showing a state in which the slinger shown in FIG. 2 is separated from the wheel hub.

FIG. 1 is a cross-sectional view showing a wheel bearing assembly 100 according to one embodiment of the present disclosure. FIG. 2 is a partially exploded view of a wheel hub and a slinger shown in FIG. 1. FIG. 3 is a cross-sectional view showing a state in which the slinger shown in FIG. 2 is separated from the wheel hub.

As shown in FIGS. 1 to 3, the wheel bearing assembly 100 according to one embodiment of the present disclosure comprises a wheel hub 110, an inner ring 120, an outer ring 130, rolling elements 140, and a slinger 150. A wheel hub and slinger assembly 50 according to one embodiment of the present disclosure comprises the wheel hub 110 and the slinger 150, and is configured to be installed to a wheel bearing so as to rotate relative to the chassis. The wheel hub and slinger assembly 50 used in the present disclosure refers to an assembly having the wheel hub 110 and the slinger 150. In the wheel hub and slinger assembly 50 and the wheel bearing assembly 100, duplicated descriptions on the wheel hub 110 and the slinger 150, which are common components, may be omitted.

A wheel of a vehicle is mounted to the wheel hub 110 at an axially outward direction OA by wheel bolts 51. A constant velocity universal joint of the vehicle is coupled to the wheel hub 110 at an axially inward direction IA. The wheel hub 110 rotates relative to the chassis (or a knuckle 53) of the vehicle together with the wheel and the constant velocity universal joint. The wheel hub 110 comprises a base surface 111 and a tolerance compensation portion 112. The base surface 111 is formed on an outer peripheral surface of the wheel hub 110, which is positioned more axially outward than a position at which the inner ring 120 and the rolling elements 140 are disposed. The wheel hub 110 comprises a stopper 114 formed to protrude from an axially inward end portion 111a of the base surface 111 in a radially outward direction OR. The stopper has an axially outward end portion surface 114a and a radially outward end portion surface 114b. A hub groove 111b, which is concave in a radially inward direction IR, is formed at a portion adjacent to the stopper 114 in the base surface 111. The hub groove 111b may be formed by turning. For example, the turning refers to a process of rotating a workpiece with a lathe and bringing a cutting tool into contact with the rotating workpiece to cut the workpiece. A radial protrusion length of the stopper 114 may be set to correspond to the thickness of a mounting portion 151 of the slinger 150.

The tolerance compensation portion 112 extends from the base surface 111 and is formed to be concave in the axially outward direction OA. In a case in which the mounting portion 151 of the slinger 150 is formed to be longer than a length from the flange surface 113 to the axially outward end portion surface 114a of the stopper 114 due to a manufacturing tolerance of the slinger 150, the tolerance compensation portion 112 receives a bent portion 152 to compensate for the manufacturing tolerance of the slinger 150. Thus, the slinger 150 can be precisely and stably mounted to the wheel hub 110.

The inner ring 120 is mounted to the wheel hub 110 and is configured to rotate with the wheel hub 110. In a state in which the inner ring 120 is press-fitted on an outer peripheral surface of the wheel hub 110, the inner ring 120 may be fixed to the wheel hub 110 by an orbital foaming. That is, the inner ring 120 is fixed to the wheel hub 110 by plastically deforming an axially inward end portion 110a of the wheel hub 110 in the radially outward direction OR.

The outer ring 130 is coupled to the knuckle 53 by knuckle bolts 52 so as to be spaced apart from the outer peripheral surface of the wheel hub 110 in the radially outward direction OR. The outer ring 130 supports the rotation of the wheel hub 110 and the inner ring 120. In one embodiment, the wheel bearing assembly 100 may further comprise an inner seal member 131 disposed between the outer ring 130 and the inner ring 120 at the axially inward direction IA of the outer ring 130. The inner seal member 131 is disposed between an outer peripheral surface 120a of the inner ring 120 and an axially inward inner peripheral inner surface 130a of the outer ring 130. The inner seal member 131 prevents foreign substance such as dust or water from inflowing between the inner ring 120 and the outer ring 130. In one embodiment, the wheel bearing assembly 100 may further comprise an outer seal member 132 disposed between the wheel hub 110 and the outer ring 130 at the axially outward direction OA of the outer ring 130. The outer seal member 132 comprises a seal frame 132a coupled to an axially outward inner peripheral surface 130b of the outer ring 130, and a plurality of seal lips 132b coupled to the seal frame 132a and protruding toward the slinger 150. The plurality of seal lips 132b may be made of rubber material and fabricated by a vulcanization-molding process. The plurality of seal lips 132b may be arranged to be in contact with the slinger 150.

The plurality of rolling elements 140 are interposed between the wheel hub 110 and the outer ring 130 and between the inner ring 120 and the outer ring 130. The rolling elements 140 may be made of metal material and may have a ball shape or a tapered cylindrical shape. In one embodiment, the wheel bearing assembly 100 may further comprise retainers 141 disposed between the wheel hub 110 and the outer ring 130 and between the inner ring 120 and the outer ring 130. The retainers 141 serve to hold the plurality of rolling elements 140 such that the plurality of rolling elements 140 are positioned between the inner ring 120 and the outer ring 130 and between the wheel hub 110 and the outer ring 130 by a certain distance along a circumferential direction. Although the wheel bearing assembly 100 is shown to have one inner ring 120 and the rolling elements 140 are disposed between the inner ring 120 and the outer ring 130 and between the wheel hub 110 and the outer ring 130 in the embodiment shown in the drawings, the wheel bearing assembly 100 may be configured such that the inner ring is not provided in the wheel bearing assembly 100 and the rolling elements 140 are disposed between the wheel hub 110 and the outer ring 130. In addition, the wheel bearing assembly may be configured such that the rolling elements 140 are disposed between a plurality of inner rings 120 and the outer ring 130.

The slinger 150 is mounted to the wheel hub 110 to be disposed between the wheel hub 110 and the outer ring 130. The slinger 150 is configured to rotate with the wheel hub 110. The slinger 150 is made of metal material and comprises the mounting portion 151 and the bent portion 152. The slinger 150 may be fabricated by pressing a flat plate or a hollow cylindrical pipe. The mounting portion 151 has an axially inward end portion 151a and a first inner peripheral surface 151b and is configured to be press-fitted to the base surface 111 of the wheel hub 110. The slinger 150 is mounted to the wheel hub 110 such that the mounting portion 151 is positioned between the flange surface 113 and the stopper 114. The bent portion 152 has a second inner peripheral surface 152a spaced apart from the tolerance compensation portion 112 and extends from the mounting portion 151 in a curved surface shape toward the radially outward direction OR.

In one embodiment, the wheel hub 110 may further comprise the flange surface 113 extending from the tolerance compensation portion 112 in the radially outward direction OR. That is, the tolerance compensation portion 112 connects the base surface 111 and the flange surface 113. In one embodiment, the slinger 150 may further comprise an extending portion 153 extending from the bent portion 152 in the radially outward direction OR. That is, the bent portion 152 connects the mounting portion 151 and the extending portion 153. The extending portion 153 has a contact surface 153a which is brought into contact with the flange surface 113 of the wheel hub 110.

In one embodiment, an axial length L2 between the contact surface 153a of the extending portion 153 and the axially inward end portion 151a of the mounting portion 151 may be set to be longer than an axial length L1 between the flange surface 113 of the wheel hub 110 and the axially outward end portion surface 114a of the stopper 114 (e.g., a case in which the length L2 is formed to be longer than the length L1 due to the manufacturing tolerances of the slinger 150 and the wheel hub 110), as shown in FIG. 3. For example, the minimum value of the length L2 in consideration of the manufacturing tolerance of the slinger 150 may be set to be longer than the maximum value of the length L1 in consideration of the manufacturing tolerance of the wheel hub 110. Therefore, even if the manufacturing tolerances of the slinger 150 and the wheel hub 110 are taken into consideration, the length L2 may be set to be always longer than the length L1. Here, the length L1 represents a length before the flange surface 113 is deformed in the axially inward direction IA or the axially outward direction OA, and the length L2 represents a length before the slinger 150 is mounted to the wheel hub 110. If the length L2 is set to be excessively longer than the length L1, the slinger 150 may not be mounted on the base surface 111 in a state in which the slinger 150 is entirely in contact with the base surface 111. Thus, when external impact is transferred to the extending portion 153 through the flange surface 113, the slinger 150 may bounce off by virtue of its elastic restoration force, and a clamping force between the slinger 150 and the wheel hub 110 may be reduced.

In one embodiment, the slinger 150 may further comprise a seal portion 154, which is extends in the axially inward direction IA from an end portion of the extending portion 153 in the radially outward direction OR. Since an axially inward end portion of the seal portion 154 is disposed adjacent to the outer ring 130 or the outer seal member 132, a sealing property between the wheel hub 110 and the outer ring 130 can be enhanced.

Figure 4:
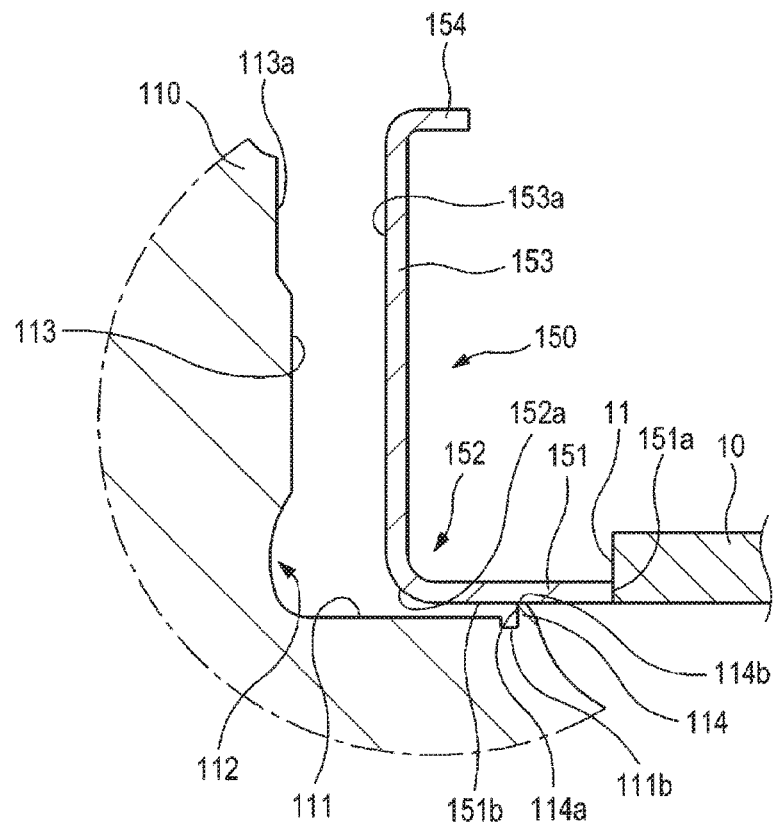
FIG. 4 is a cross-sectional view showing a state in which a mounting portion of the slinger shown in FIG. 2 is positioned at a radially outward end portion surface of a stopper.
Figure 5:
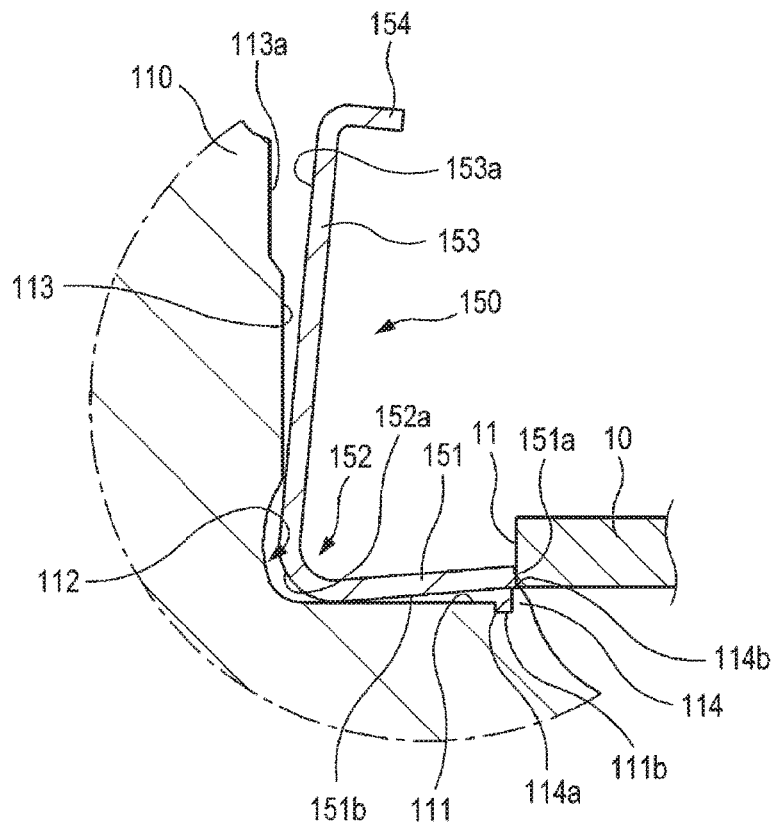
FIG. 5 is a cross-sectional view showing a state in which a portion of a bent portion of the slinger shown in FIG. 2 is elastically deformed.
Figure 6:
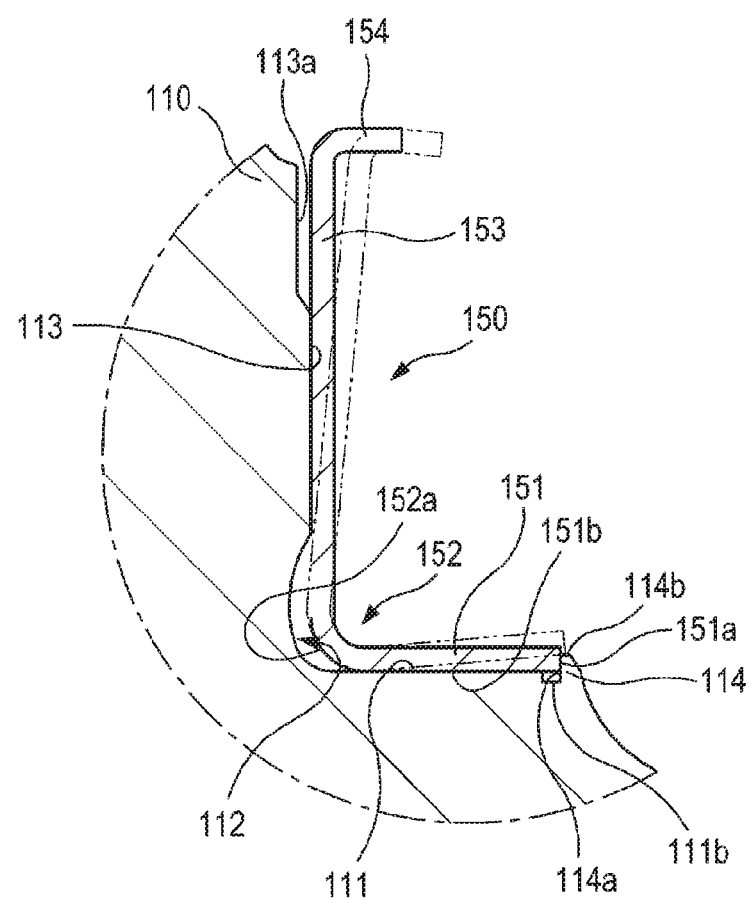
FIG. 6 is a cross-sectional view showing both the slinger shown in FIG. 2 and the slinger shown in FIG. 5.

FIG. 4 is a cross-sectional view showing a state in which the mounting portion 151 of the slinger 150 shown in FIG. 2 is located at the radially outward end portion surface 114b of the stopper 114. FIG. 5 is a cross-sectional view showing a state in which a portion of the bent portion 152 of the slinger 150 shown in FIG. 2 is elastically deformed. FIG. 6 is a cross-sectional view showing both the slinger 150 shown in FIG. 2 and the slinger 150 shown in FIG. 5.

In one embodiment, the slinger 150 may be mounted to the wheel hub 110 such that the mounting portion 151 passes through the radially outward end portion surface 114b of the stopper 114 in the axially outward direction OA from the stopper 114 as shown in FIG. 4, and then the axially inward end portion 151a of the mounting portion 151 is caught to the stopper 114 as shown in FIG. 2. The slinger 150 is mounted to the wheel hub 110 in the axially outward direction OA using a jig 10. For example, the jig 10 may be configured such that a pushing portion 11 pushes the axially inward end portion 151a of the mounting portion 151 in the axially outward direction OA. As shown in FIG. 5, when the mounting portion 151 is positioned at the radially outward end portion surface 114b of the stopper 114, the mounting portion 151 is elastically deformed in a direction away from the base surface 111 (that is, a direction toward the extending portion 153). In this state, the extending portion 153 may be elastically deformed obliquely with respect to the flange surface 113.

In one embodiment, when the mounting portion 151 passes through the radially outward end portion surface 114b of the stopper 114, a portion of the bent portion 152 may be elastically deformed inward of the tolerance compensation portion 112, as shown in FIG. 5. In a state in which the contact surface 153a of the extending portion 153 is brought into partial contact with the flange surface 113 of the wheel hub 110 and the first inner peripheral surface 151b of the mounting portion 151 is brought into partial contact with the base surface 111 of the wheel hub 110, when the jig 10 further pushes the slinger 150 in the axially outward direction OA, a portion of the bent portion 152 is elastically deformed inward of the tolerance compensation portion 112. When the length L2 in the slinger 150 is set to be longer than the length L1 in the wheel hub 110, the extent that the bent portion 152 is elastically deformed inward of the tolerance compensation portion 112 may become larger.

In one embodiment, after a portion of the bent portion 152 is elastically deformed inward of the tolerance compensation portion 112, the axially inward end portion 151a of the mounting portion 151 may push the stopper 114 by virtue of the elastic restoration force of the bent portion 152, as shown in FIG. 6. When the jig 10 is moved to the axially outward end portion surface 114a of the stopper 114 along the axially outward direction OA, the axially inward end portion 151a of the mounting portion 151 is locked to the stopper 114 such that the axially inward end portion 151a of the mounting portion 151 pushes the stopper 114 in the axially inward direction IA by virtue of the elastic restoration force stored in the bent portion 152. Further, the first inner peripheral surface 151b of the mounting portion 151 is brought into contact with the base surface 111 by virtue of the elastic restoration force stored in the mounting portion 151. Therefore, the mounting portion 151 and the bent portion 152 of the slinger 150 are elastically fitted between the flange surface 113 and the stopper 114 by virtue of the elastic restoration force of the bent portion 152. As a result, it is possible to reduce or suppress the axial movement of the slinger 150 relative to the wheel hub 110.

The slinger 150 may be fabricated in a state that the length of the mounting portion 151 is longer than a predetermined design value or shorter than the predetermined design value due to the manufacturing tolerance. In such a case, there is a possibility that the slinger is not properly mounted on the wheel hub or is axially moved due to the tolerances of the mounting portion. Meanwhile, in the wheel hub 110 according to the present disclosure, the tolerance compensation portion 112 is formed and a portion of the slinger 150 is elastically deformed inward of the tolerance compensation portion 112. That is, in the case in which the mounting portion 151 of the slinger 150 is formed to have an axial length longer than a length from the flange surface 113 to the axially outward end portion surface 114a of the stopper 114, the tolerance compensation portion 112 receives the bent portion 152 to compensate for the tolerance of the slinger 150. Thus, the slinger 150 can be interposed between the flange surface 113 and the stopper 114 and mounted to the wheel hub 110 regardless of the tolerance. Further, it is possible to reduce or suppress the slinger 150 from moving axially relative to the wheel hub 110.

In one embodiment, the slinger 150 may be mounted on the wheel hub 110 such that the axially inward end portion 151a of the mounting portion 151 is spaced apart from the axially outward end portion surface 114a of the stopper 114 (e.g., a case in which the length L2 is formed to be shorter than the length L1 due to the manufacturing tolerances of the slinger 150 and the wheel hub 110). Further, since the wheel hub 110 according to the present disclosure is configured such that the tolerance compensation portion 112 is formed and a portion of the bent portion 152 of the slinger 150 is elastically deformed inward of the tolerance compensation portion 112, a distance between the axially inward end portion 151a of the mounting portion 151 and the axially outward end portion surface 114a of the stopper 114 may be set to be shorter than that in the related art. When the slinger 150 has the minimum tolerance and the wheel hub 110 has the maximum tolerance, the distance between the axially inward end portion 151a of the mounting portion 151 and the axially outward end portion surface 114a of the stopper 114 may be minimized. Therefore, even if the slinger 150 is formed to have a length shorter than a predetermined design value, it is possible to minimize the axial movement of the slinger 150 with respect to the wheel hub 110. As a result, an increase in interference between the outer seal member 132 and the slinger 150 and an increase in drag torque of the wheel bearing can be suppressed.

In a case in which the wheel hub 110 and the slinger 150 are fabricated to have precise dimensions without manufacturing tolerances (i.e., length L1=length L2), when the slinger 150 is completely mounted on the wheel hub 110, the axially inward end portion 151a of the mounting portion 151 is brought into contact with the axially outward end portion surface 114a of the stopper 114 and is caught to the stopper 114. The first inner peripheral surface 151b of the mounting portion 151 is brought into contact with the base surface 111 of the wheel hub 110. Accordingly, it is possible to prevent the slinger 150 from moving axially with respect to the wheel hub 110. As a result, an increase in interference between the outer seal member 132 and the slinger 150 and an increase in drag torque of the wheel bearing can be prevented.

When the vehicle travels along a curved road, the flange surface 113 of the wheel hub 110 may be slightly bent or deformed in the axially inward direction IA. In this case, since the tolerance compensation portion 112 is formed in the wheel hub 110 and the bent portion 152 is formed in the slinger 150 in the wheel bearing assembly of the present disclosure, as the flange surface 113 deforms in the axially inward direction IA, a portion of the bent portion 152 can be elastically deformed inward of the tolerance compensation portion 112. That is, even if the flange surface 113 is bent or deformed in the axially inward direction IA, the slinger 150 does not move along the axial direction from the wheel hub 110. Further, when the flange surface 113 returns to its original position, the extending portion 153 can return to its original position by virtue of the elastic restoration force stored in the bent portion 152. Therefore, even when the vehicle travels along a curved road, it is possible to maintain the state in which the contact surface 153a of the extending portion 153 and the flange surface 113 of the wheel hub 110 are in contact with each other.

In one embodiment, the flange surface 113 may comprise a second flange surface 113a that is partially spaced apart from the contact surface 153a of the extending portion 153. Since the second flange surface 113a is disposed to be spaced apart from the contact surface 153a, the impact directly transferred to the extending portion 153 through the flange surface 113 can be reduced. Accordingly, it is possible to minimize the movement of the slinger 150 in the axially inward direction IA. Further, even when the flange surface 113 is deformed in the axially inward direction IA, it is possible to minimize the movement of the slinger 150 in the axially inward direction IA.

In one embodiment, the axially outward end portion surface 114a of the stopper 114 may be formed to make an acute angle with the base surface 111. As an example, the axially outward end portion surface 114a of the stopper 114 may be formed to be perpendicular to a central axis C of the wheel hub 110, and the base surface 111 may be formed obliquely with respect to the central axis C so as to make an acute angle with the axially outward end portion surface 114a of the stopper 114. As another example, the base surface 111 may be formed in a parallel with the center axis C, and the axially outward end portion surface 114a of the stopper 114 may be formed obliquely with respect to the center axis C so as to make an acute angle with the base surface 111. As such, since the axially outward end portion surface 114a of the stopper 114 and the base surface 111 make the acute angle with respect to each other, the axially inward end portion 151a of the mounting portion 151 pushes the stopper 114 in a direction extending between the base surface 111 and the axially outward end portion surface 114a of the stopper 114 (that is, a direction extending toward the central axis C). As a result, it is possible to more efficiently reduce or suppress the axial movement of the slinger 150 relative to the wheel hub 110.

In one embodiment, the tolerance compensation portion 112 may be formed to be positioned in the radially outward direction of the base surface 111. Further, the tolerance compensation portion 112 may be formed to be positioned in the axially outward direction of the flange surface 113. That is, the tolerance compensation portion 112 is formed to be concave from the flange surface 113 in the axially outward direction OA, but not formed to be concave from the base surface 111 in the radially inward direction IR. For example, the tolerance compensation portion 112 may be formed by cutting the flange surface 113. In this case, since the tolerance compensation portion 112 may be formed by cutting only the flange surface 113 in the axially outward direction, it is possible to easily form the tolerance compensation portion 112, as compared with a case of cutting the base surface 111 and the flange surface 113 together.

When the flange surface 113 of the wheel hub 110 is slightly bent or deformed in the axially inward direction IA by an external impact, stress may be concentrated on a corner portion where the base surface 111 and flange surface 113 meet, and cracks may be generated. However, the tolerance compensation section 112 formed in the wheel hub 110 can prevent the stress from being concentrated on the corner portion. The tolerance compensation portion 112 absorbs the external impact applied to the flange surface 113 or assists the elastic deformation of the flange surface 113. Accordingly, it is possible to enhance the flexibility and durability of the wheel hub 110.

In one embodiment, the tolerance compensation portion 112 may be formed to have a size that does not affect the rigidity of the wheel hub 110. For example, the size of the tolerance compensation portion 112 may be determined in consideration of the maximum tolerance of the slinger 150 and the maximum tolerance of the wheel hub 110. If the tolerance compensation portion 112 is too large, the rigidity of the wheel hub 110 may be decreased. Meanwhile, if the tolerance compensation portion 112 is too small, it is difficult for the bent portion 152 of the slinger 150 to be elastically deformed inward of the tolerance compensation portion 112. Further, it is difficult to prevent the stress from being concentrated on the tolerance compensation portion 112.

Figure 7:
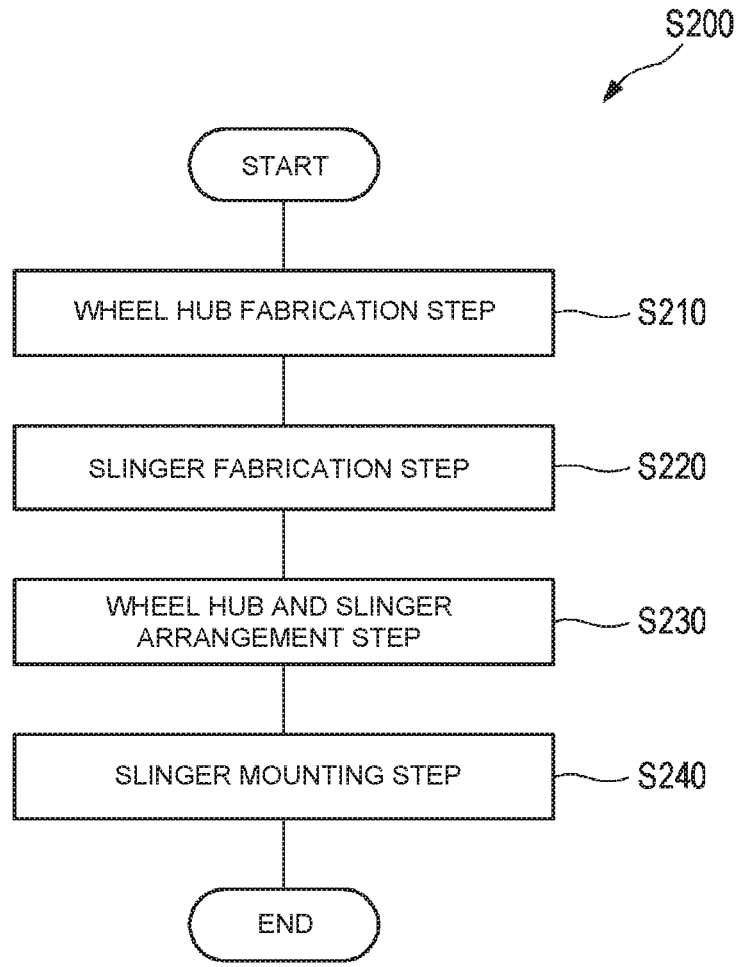
FIG. 7 is a flowchart for explaining a method of producing a wheel hub and slinger assembly according to one embodiment of the present disclosure.
Figure 8:
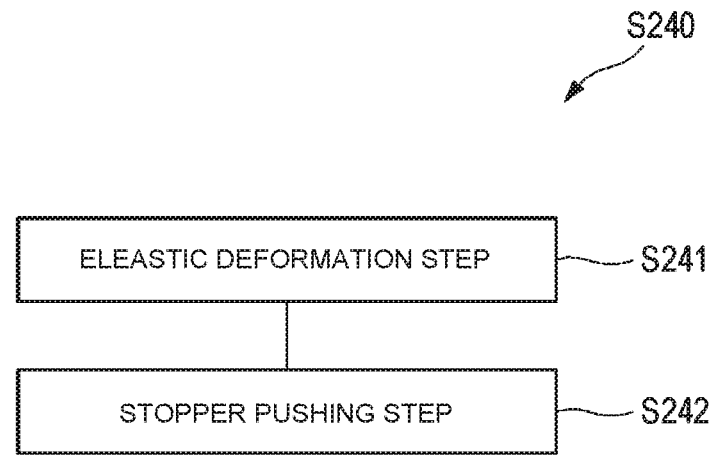
FIG. 8 is a flowchart for explaining a slinger mounting step shown in FIG. 7.

FIG. 7 is a flowchart for explaining a method S200 of producing a wheel hub and slinger assembly according to one embodiment of the present disclosure. FIG. 8 is a flowchart for explaining a slinger mounting step S240 shown in FIG. 7.

As shown in FIG. 7, the method S200 of producing a wheel hub and slinger assembly according to one embodiment of the present disclosure comprises a wheel hub fabrication step S210, a slinger fabrication step S220, a wheel hub and slinger arrangement step S230, and a slinger mounting step S240. In the method S200 according to present embodiment, the wheel hub 110 and the slinger 150 may be configured to be identical to or similar with the wheel hub 110 and the slinger 150, which are the components of the wheel hub and slinger assembly 50 and the wheel bearing assembly 100, and thus detailed descriptions thereof will be omitted.

In the wheel hub fabrication step S210, the wheel hub 110 is fabricated to comprise the base surface 111, the tolerance compensation portion 112 extending from the base surface 111 and formed to be concave in the axially outward direction OA, and the flange surface 113 extending from the tolerance compensation portion 112 in the radially outward direction OR. Further, in the wheel hub fabrication step S210, the stopper 114 is formed on the wheel hub 110 so as to protrude in the radially outward direction OR from the axially inward end portion 111a of the base surface 111 and have the axially outward end portion surface 114a.

In the slinger fabrication step S220, the slinger 150 is fabricated to comprise the mounting portion 151 which has the axially inward end portion 151a and is press-fitted to the base surface 111, the bent portion 152 which is spaced apart from the tolerance compensation portion 112 and extends from the mounting portion 151 in a curved surface shape, and the extending portion 153 which extends from the bent portion 152 in the radially outward direction OR and is brought into contact with the flange surface 113.

In the wheel hub and slinger arrangement step S230, a center axis of the slinger 150 is set to be in a coaxial relationship with the central axis C of the wheel hub 110.

In the slinger mounting step S240, the slinger 150 is mounted to the wheel hub 110 such that the mounting portion 151 is positioned between the flange surface 113 and the stopper 114 using the jig 10.

In the slinger mounting step S240 according to one embodiment, the mounting portion 151 passes through the radially outward end portion surface 114b of the stopper 114 in the axially outward direction OA from the stopper 114, and then the axially inward end portion 151a of the mounting portion 151 may be caught to the stopper 114.

As shown in FIG. 8, the slinger mounting step S240 according to one embodiment may comprise an elastic deformation step S241 and a stopper pushing step S242. In the elastic deformation step S241, a portion of the bent portion 152 is elastically deformed inward of the tolerance compensation portion 112. In the stopper pushing step S242, the axially inward end portion 151a of the mounting portion 151 pushes the stopper 114 by virtue of the elastic restoration force of the bent portion 152. Therefore, the mounting portion 151 and the bent portion 152 of the slinger 150 are elastically mounted between the flange surface 113 and the stopper 114 by virtue of the elastic restoration force of the bent portion 152. As a result, it is possible to efficiently reduce or suppress the axial movement of the slinger 150 relative to the wheel hub 110.

In the slinger mounting step S240 according to one embodiment, the jig 10 pushes the axially inward end portion 151a of the mounting portion 151, as shown in FIGS. 4 and 5. The jig 10 may comprise the pushing portion 11 configured to push the axially inward end portion 151a of the mounting portion 151.

Figure 9:
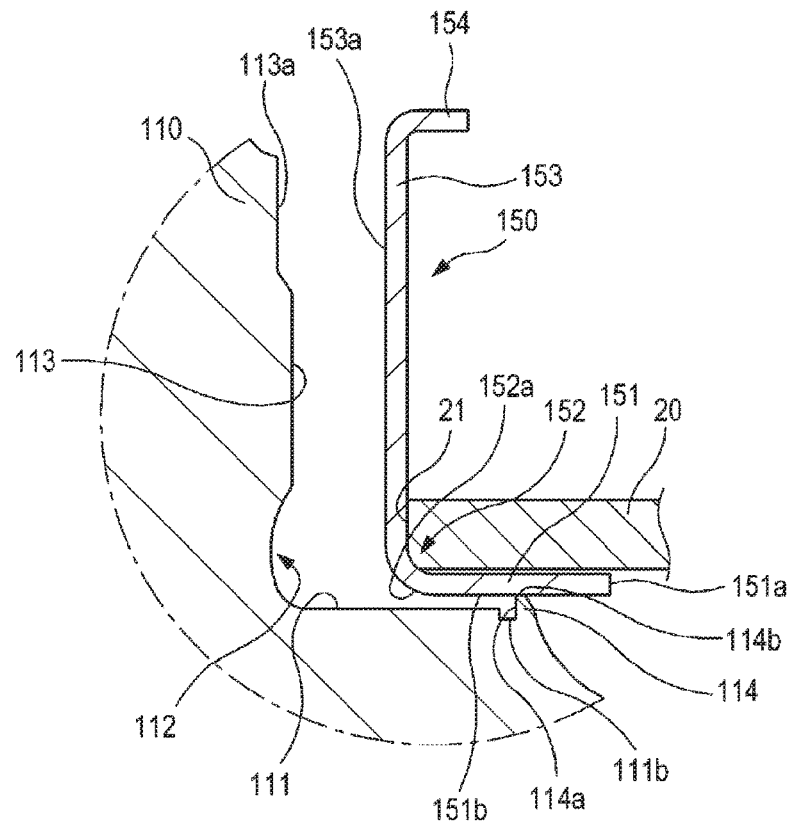
FIG. 9 is a cross-sectional view showing a configuration in which the slinger is pushed by a jig according to another embodiment.
Figure 10:
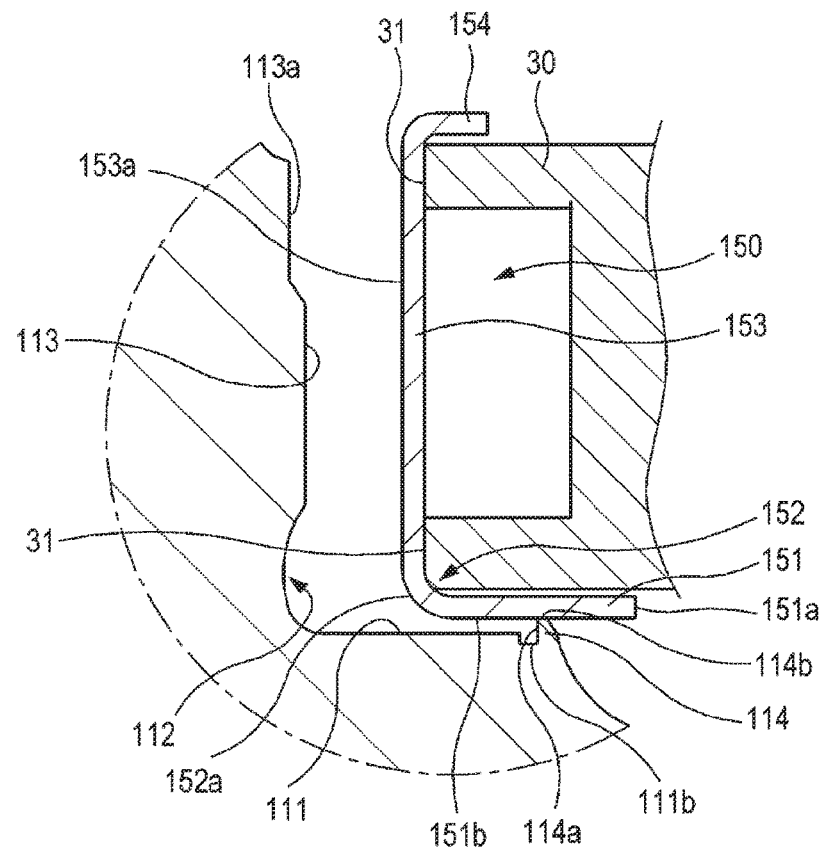
FIG. 10 is a cross-sectional view showing a configuration in which the slinger is pushed by a jig according to still another embodiment.
Figure 11:
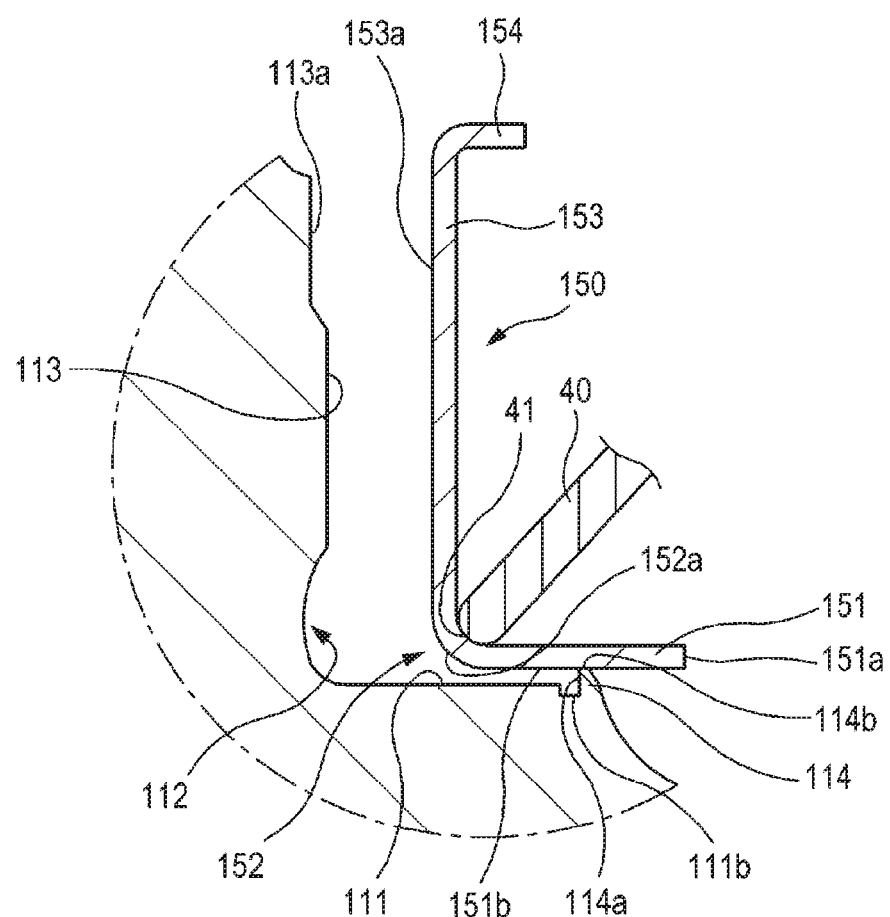
FIG. 11 is a cross-sectional view showing a configuration in which the slinger is pushed by a jig according to still another embodiment.

FIG. 9 is a cross-sectional view showing a configuration in which the slinger 150 is pushed by a jig 20 according to another embodiment. FIG. 10 is a cross-sectional view showing a configuration in which the slinger 150 is pushed by a jig 30 according to still another embodiment. FIG. 11 is a cross-sectional view showing a configuration in which the slinger 150 is pushed by a jig 40 according to still another embodiment.

In the slinger mounting step S240 according to one embodiment, the jig 20 according to another embodiment may push a portion adjacent to the bent portion 152 in the extending portion 153, as shown in FIG. 9. The jig 20 may comprise a pushing portion 21 configured to push the portion adjacent to the bent portion 152 in the extending portion 153. Since the pushing portion 21 of the jig 20 is configured to push the portion adjacent to the bent portion 152 in the extending portion 153, a portion of the bent portion 152 can be easily elastically deformed inward of the tolerance compensation portion 112.

In the slinger mounting step S240 according to one embodiment, the jig 30 according to still another embodiment may push a portion adjacent to the bent portion 152 in the extending portion 153 and a portion adjacent to an radially outward end portion (e.g., the seal portion 154) in the extending portion 153, as shown in FIG. 10. The jig 30 may comprise two pushing portions 31 configured to push the portion adjacent to the bent portion 152 and the portion adjacent to the seal portion 154 in the extending portion 153. Since the pushing portions 31 of the jig 30 are configured to simultaneously push the portion adjacent to the bent portion 152 and the portion adjacent to the seal portion 154 in the extending portion 153, the bent portion 152 can be easily elastically deformed inward of the tolerance compensation portion 112, and the extending portion 153 can be brought into contact with the flange surface 113 as a whole.

In the slinger mounting step S240 according to one embodiment, the jig 40 according to still another embodiment may push the bent portion 152, as shown in FIG. 11. The jig 40 may comprise a pushing portion 41 configured to push the bent portion 152. In this case, the pushing portion 41 of the jig 40 may have a rounded shape which corresponds to the shape of the bent portion 152. Since the pushing portion 41 of the jig 40 directly pushes the bent portion 152, the bent portion 152 can be more easily elastically deformed inward of the tolerance compensation portion 112.

Although the technical spirit of the present disclosure has been described using some embodiments and examples shown in the accompanying drawings, it should be noted that various substitutions, modification, and variations can be devised by those skilled in the art to which the present disclosure pertains without departing from the technical spirit and scope of the present disclosure. Further, it should be construed that these substitutions, modifications, and variations are included within the scope of the appended claims.

What is claimed is:

1. A wheel bearing assembly comprising:
   a wheel hub comprising a base surface, a tolerance compensation portion which extends from the base surface and is formed to be concave in an axially outward direction, and a flange surface extending from the tolerance compensation portion in a radially outward direction;
   at least one inner ring mounted to the wheel hub;
   an outer ring disposed to be spaced apart from an outer peripheral surface of the wheel hub in the radially outward direction;
   a plurality of rolling elements interposed between the inner ring and the outer ring and between the wheel hub and the outer ring; and
   a slinger comprising a mounting portion having an axially inward end portion and a first inner peripheral surface and configured to be press-fitted to the base surface, a bent portion having a second inner peripheral surface spaced apart from the tolerance compensation portion and extending from the mounting portion in a curved surface shape, and an extending portion extending from the bent portion in the radially outward direction and having a contact surface in contact with the flange surface,
   wherein a stopper is formed on the wheel hub so as to protrude from an axially inward end portion of the base surface in the radially outward direction, the stopper having an axially outward end portion surface and a radially outward end portion surface, and
   wherein the slinger is mounted to the wheel hub such that the mounting portion is positioned on the base surface,
   wherein the tolerance compensation portion is formed to be concave from the flange surface in the radially outward direction,
   wherein the slinger is mounted to the wheel hub such that the axially inward end portion of the mounting portion is brought into contact with the axially outward end portion surface of the stopper,
   wherein an axial length between the contact surface of the extending portion and the axially inward end portion of the mounting portion before the slinger is mounted to the wheel hub is equal or longer than an axial length between the flange surface of the wheel hub and the axially outward end portion surface of the stopper.

2. The wheel bearing assembly of claim 1, wherein the slinger is mounted to the wheel hub such that the mounting portion passes through the radially outward end portion surface of the stopper in the axially outward direction from the stopper, and then the axially inward end portion of the mounting portion is caught to the stopper.

3. The wheel bearing assembly of claim 2, wherein when the mounting portion passes through the radially outward end portion surface of the stopper, a portion of the bent portion is elastically deformed inward of the tolerance compensation portion.

4. The wheel bearing assembly of claim 3, wherein after a portion of the bent portion is elastically deformed inward of the tolerance compensation portion, the axially inward end portion of the mounting portion pushes the stopper by virtue of an elastic restoration force of the bent portion.

5. The wheel bearing assembly of claim 1, wherein the tolerance compensation portion is formed to be positioned in the radially outward direction of the base surface, and the tolerance compensation portion is formed to be positioned in the axially outward direction of the flange surface.

6. The wheel bearing assembly of claim 1, wherein the flange surface comprises a second flange surface which is spaced apart from the contact surface of the extending portion.

* * * * *